United States Patent [19]

Fujino et al.

[11] Patent Number: 4,859,641
[45] Date of Patent: Aug. 22, 1989

[54] NONREDUCIBLE DIELECTRIC CERAMIC COMPOSITION

[76] Inventors: Masaru Fujino, 8-1, Oryu, Shimokaiinji, Nagaokakyo-shi, Kyoto-fu; Goro Nishioka, 1-19-14, Tsudaminamicho, Hirakata-shi, Osaka-fu; Yukio Sakabe, 1-6, Shinonome, Tahara, Hiyoshicho, Funai-gun, Kyoto-fu, all of Japan

[21] Appl. No.: 169,393

[22] Filed: Mar. 9, 1988

[30] Foreign Application Priority Data

Mar. 11, 1987 [JP] Japan .................................. 62-56206
Mar. 11, 1987 [JP] Japan .................................. 62-56207
Mar. 11, 1987 [JP] Japan .................................. 62-56208

[51] Int. Cl.$^4$ ........................................... C04B 35/49
[52] U.S. Cl. .................................................. 501/136
[58] Field of Search ....................................... 501/136

[56] References Cited

U.S. PATENT DOCUMENTS 4,438,214 3/1984 Masuyama et al. ................. 501/136

Primary Examiner—Mark L. Bell
Attorney, Agent, or Firm—Ostrolenk, Faber, Gerb & Soffen

[57] ABSTRACT

A nonreducible dielectric ceramic composition consists essentially of a main component expressed by the formula:

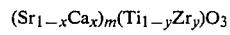

$$(Sr_{1-x}Ca_x)_m(Ti_{1-y}Zr_y)O_3$$

wherein x an dy are molar fractions of the respective elements, and m is molar ratio of $(Sr_{1-x}Ca_x)$ to $(Ti_{1-y}Zr_y)$, and wherein x, y and m take values within the following respective ranges: $0.30 \leq x \leq 0.50$, $0.03 \leq y \leq 0.20$, $0.95 \leq m \leq 1.08$, and secondary components composed of at least manganese oxides and $SiO_2$. The content of each secondary component per 100 parts by weight of the main component is 0.01 to 2.00 parts by weight for manganese oxides in terms of $MnO_2$, and 0.10 to 4.00 parts by weight for $SiO_2$. The composition may contain, as one of the secondary components, 0.01 to 1.00 parts by weight of MgO or ZnO per 100 parts by weight of the main component. The composition is useful as material for multilayer ceramic capacitors.

8 Claims, No Drawings

NONREDUCIBLE DIELECTRIC CERAMIC COMPOSITION

FIELD OF THE INVENTION

This invention relates to a nonreducible dielectric ceramic composition and, more particularly, to a dielectric ceramic composition which is not reduced to a semiconductive material by firing in a neutral or reducing atmosphere with a low oxygen pressure at a temperature of not more than 1360° C.

BACKGROUND OF THE INVENTION

In general, multilayer ceramic capacitors have been fabricated by first preparing ceramic green sheets, printing a conductive ink for internal electrodes (composed of metal powder suspended in an organic vehicle) in the designed pattern on the ceramic green sheets, stacking several printed green sheets one on another under pressure, cutting the resultant stack into individual capacitor chips and, finally, firing the chips to complete multilayer ceramic capacitor units.

Most of the conventional dielectric ceramic materials for multilayer ceramic capacitors must be fired in an oxidizing atmosphere since they are reduced to a semiconductive material when fired in a neutral or reducing atmosphere with a low partial pressure of oxygen. Thus, a material for internal electrodes which is fired together with the dielectric ceramics is required to meet the following requirements: Firstly, it must not melt or evaporate at a sintering temperature of the ceramic dielectrics. Secondly, it must not oxidize or react with dielectrics even if the sintering is carried out under such a high partial pressure of oxygen that the ceramics is never reduced to a semiconductive material. Thus, it is required to use a noble metal such as, for example, platinum or palladium as a material for internal electrodes. However, the use of such a noble metal is an obstacle to reduction of the manufacturing cost of the multilayer ceramic capacitors and production of multilayer ceramic capacitors larger in capacitance but small in size.

For this reason, there is a craving to use a base metal such as, for example, nickel, instead of the noble metals for internal electrodes. To do this, it is required to develop a dielectric ceramic material which meets such requirements that it is never reduced to a semiconductive material even when fired in a neutral or reducing atmosphere with a low partial pressure of oxygen at 1360° C. or less, and that is has a sufficiently high specific resistance and excellent dielectric characteristics required for ceramic dielectrics for capacitors.

In Japanese patent application laid-open No. 131708/1985, there is disclosed a nonreducible dielectric ceramic composition for temperature compensating capacitors which consists essentially of a solid solution expressed by the formula:

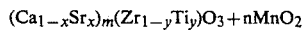

wherein the subscripts x, y, m and n take the following respective values: $0 \leq x < 0.6$, $0 \leq y < 0.6$, $0.85 < m < 1.30$, and $0.005 < n < 0.08$. The dielectric ceramic composition of this system can be produced by firing in a non-oxidizing atmosphere at a temperature of 1300° to 1400° C., thus making it possible to use a base metal as a material for internal electrodes of the multilayer ceramic capacitors. However, the dielectric constant of this dielectric ceramics is only 108 at the maximum, thus making it difficult to produce ceramic capacitors with a large capacitance without increase in volume.

SUMMARY OF THE INVENTION

It is therefore an object of the present invention to provide a nonreducible dielectric ceramic composition which is never reduced to a semiconductive material even if fired in a neutral or reducing atmosphere with a low partial pressure of oxygen at 1360° C. or below, and makes it possible to use base metals such as, for example, Ni, Fe, Cr and their alloys as a material for internal electrodes to produce multilayer ceramic capacitors which are large in capacitance but small in size.

Another object of the present invention is to provide a nonreducible dielectric ceramic composition which can be sintered in a neutral or reducing atmosphere at a temperature of not more than 1360° C. without being reduced to a semiconductive material and which has a small absolute value of the temperature coefficient o capacitance of less than 1000 ppm/°C., a large dielectric constant of not less than 200, a low dielectric loss (tan δ) of not more than 0.2% and a specific resistance at 20° C. of not less than $1 \times 10^{12} \Omega$cm.

According to the present invention, the above objects are achieved by incorporating a suitable amount of secondary components composed of at least manganese oxides and silicon dioxide into a main component expressed by the formula:

wherein the subscripts x, y and m are molar fractions of the respective components and take values within the following respective ranges: $0.30 \leq x \leq 0.50$, $0.03 \leq y \leq 0.20$, $0.95 \leq m \leq 1.08$.

In the preferred embodiments, a suitable amount of magnesium oxide or zinc oxide is incorporated into the main component as one of the secondary components in addition to manganese oxides and silicon dioxide.

These and other objects, features and advantages of the present invention will be further apparent from the detailed description given hereinafter. It should be understood, however, that detailed description and specific examples, while indicating preferred embodiments of the invention, are given by way of illustration only, since various changes and modifications within the spirit and scope of the invention will become apparent to those skilled in the art from this description.

DETAILED DESCRIPTION OF THE INVENTION

According to the present invention there is provided a nonreducible dielectric ceramic composition consisting essentially of a main component expressed by the formula:

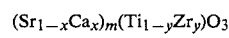

wherein the subscripts x and y are molar fractions of the respective elements, wherein m is molar ratio of $(Sr_{1-x}Ca_x)$ to $(Ti_{1-y}Zr_y)$, and wherein x, y and m take values within the following respective ranges: $0.30 \leq x \leq 0.50$, $0.03 \leq y \leq 0.20$, $0.95 \leq m \leq 1.08$, and containing, as secondary components, manganese oxides and $SiO_2$, the content of each secondary component per 100 parts by weight of the main component being 0.01 to 2.00 parts by weight for manganese oxides in terms of $MnO_2$, and 0.10 to 4.00 parts by weight for $SiO_2$.

According to the present invention, there is also provided a nonreducible dielectric ceramic composition consisting essentially of a main component expressed by the formula:

$$(Sr_{1-x}Ca_x)_m(Ti_{1-y}Zr_y)O_3$$

wherein the subscripts x and y are molar fractions of the respective elements, wherein m is molar ratio of $(Sr_{1-x}Ca_x)$ to $(Ti_{1-y}Zr_y)$, and wherein x, y and m take values within the following respective ranges: $0.30 \leq x \leq 0.50$, $0.03 \leq y \leq 0.20$, $0.95 \leq m \leq 1.08$, and containing, as secondary components, manganese oxides, $SiO_2$ and MgO, the content of each secondary component per 100 parts by weight of the main component being 0.01 to 2.00 parts by weight for manganese oxides in terms of $MnO_2$, 0.10 to 4.00 parts by weight for $SiO_2$, and 0.01 to 1.00 parts by weight for MgO.

In the preferred embodiment there is further provided a nonreducible dielectric ceramic composition consisting essentially of a main component expressed by the formula:

$$(Sr_{1-x}Ca_x)_m(Ti_{1-y}Zr_y)O_3$$

wherein the subscripts x and y are molar fractions of the respective elements, wherein m is molar ratio of $(Sr_{1-x}Ca_x)$ to $(Ti_{1-y}Zr_y)$, and wherein x, y and m take values within the following respective ranges: $0.30 \leq x \leq 0.50$, $0.03 \leq y \leq 0.20$, $0.95 \leq m \leq 1.08$, and containing, as secondary components, manganese oxides, $SiO_2$ and MgO, the content of each secondary component per 100 parts by weight of the main component being 0.01 to 2.00 parts by weight for manganese oxides in terms of $MnO_2$, 0.10 to 4.00 parts by weight for $SiO_2$, and 0.01 to 1.00 parts by weight for ZnO.

The reasons why x, y and m in the general formula for the main component have been limited to the above respective ranges are as follows: If x, i.e., the molar fraction of Ca in the A site is less than 0.30 or more than 0.50, the sintering temperature becomes more than 1360° C. and the absolute value of the temperature coefficient of capacitance become larger than 1000 ppm/°C. For these reasons, x has been limited to a value within the range of 0.30 to 0.50.

y, i.e., the molar fraction of Zr in the B site, has been limited to a value within the range of 0.03 to 0.20 for the following reasons: If y is less than 0.03, the dielectric loss (tan δ) becomes more than 0.2%, and the specific resistance at 25° C. or 85° C. becomes less than $1 \times 10^{12}$ Ωcm. If y is more than 0.20, the sintering temperature becomes more than 1360° C. and the absolute value of the temperature coefficient of capacitance becomes more than 1000 ppm/°C.

If the molar ratio of A site to B site, i.e., m, is less than 0.95, the specific resistance at 25° C. and 85° C. becomes less than $1 \times 10^{12}$ Ω-cm and the dielectric loss (tan &) becomes more than 0.2%. If m is more than 1.08, the sintering temperature becomes higher than 1360 and the absolute value of the temperature coefficient of capacitance becomes more than 1000 ppm/°C. For these reasons, m has been limited to a value within the range of 0.95 to 1.08.

The content of each secondary component has been limited to the above range for the following reasons: If the content of manganese oxides in terms of $MnO_2$ is less than 0.01 part by weight per 100 parts by weight of the main component, the sintering temperature becomes higher than 1360° C., the dielectric loss (tan δ) becomes more than 0.2%, and the specific resistance becomes lower than $1 \times 10^{12}$ Ω-cm. If the content of manganese oxides is more than 2.00 parts by weight, it causes such disadvantages that the absolute value of the temperature coefficient of capacitance becomes greater than 1000 ppm/°C., that the dielectric loss (tan δ) becomes more than 0.2%, and that the specific resistance becomes lower than $1 \times 10^{12}$ Ωcm at 25° C. and 85° C.

$SiO_2$ is added to the main component to lower its sintering temperature and to improve the temperature characteristics of capacitance. If the content of $SiO_2$ is less than 0.10, the sintering temperature becomes higher than 1360° C. and the absolute value of the temperature coefficient of capacitance becomes greater than 1000 ppm/°C. If the content of $SiO_2$ is more than 4.00 parts by weight, the dielectric constant becomes less than 200 and tan δ becomes more than 0.2%. Thus, the content of $SiO_2$ has been limited to the above range.

The content of the additional one element selected from the group consisting of MgO and ZnO has been limited to 0.01 to 1.00 part by weight per 100 parts by weight of the main component for the following reasons.

If the content of MgO is less than 0.01, the specific resistance at 85° C. becomes lower than $1 \times 10^{12}$ Ωcm. If the content of MgO is more than 1.00, the absolute value of the temperature coefficient of capacitance becomes greater than 1000 ppm/°C. Similarly, if the content of ZnO is less than 0.01, the specific resistance at 85° C. becomes lower than $1 \times 10^{12}$ Ωcm. If the content of ZnO is more than 1.00, the absolute value of the temperature coefficient of capacitance becomes greater than 1000 ppm/°C. Thus, the contents of MgO and ZnO have been limited to the above respective ranges.

The nonreducible dielectric ceramic composition of the present invention can be sintered at a low temperature of not more than 1360° C. in a reducing atmosphere and possesses a dielectric constant of not less than 200, a low dielectric loss of not more than 0.2%, and a high specific resistance of not less than $1 \times 10^{12}$ Ωcm, and a low temperature change rate of capacitance. When producing multilayer ceramic capacitors with the composition of the present invention, it is possible to use an inexpensive base metal such as Ni, Fe, Cr and the like as a material for internal electrodes instead of the conventionally used expensive noble metals. Thus, the nonreducible dielectric ceramic composition of the present invention makes it possible to manufacture multilayer ceramic capacitors with larger capacitance without increase in cost.

EXAMPLE 1

As starting raw materials, there were used $SrCO_3$, $CaCO_3$, $ZrO_2$, $TiO_2$, $MnO_2$, and $SiO_2$ for industrial use. These raw materials were weighed to prepare a mixture for a composition expressed by the formula:

$$(Sr_{1-x}Ca_x)_m(Ti_{1-y}Zr_y)O_3 + jMnO_2 + kSiO_2$$

with values of x, y, m, j, k, and l shown in Table 1. The resultant mixture was milled by the wet process in a ball mill, dried by evaporation, calcined in natural atmosphere at 1150° C. for 2 hours, crushed and then ground to prepare calcined powder. The calcined powder was added with 5 parts by weight of a vinyl acetate binder and granulated by the wet process in a ball mill, dried by evaporation and then passed through a sieve to prepare granular powder. The resultant powder was compacted to green ceramic discs with a 10 mm diameter and a 1.2 mm thickness under a pressure of 2.5 ton/cm².

The green discs were placed on an alumina sugger having its bottom covered with zirconia powder, heated to 500° C. and maintained at that temperature for 2 hours in air to burn the binder, and then fired at 1240° to 1360° C. for 2 hours in a reducing atmosphere consisting of hydrogen and nitrogen and having a volume ratio of $H_2$ to $N_2$ is 3/100.

Sintered ceramic discs were provided with In-Ga alloy electrodes on opposite sides and subjected to measurement of electrical properties. The dielectric constant ($\epsilon$) and dielectric constant (tan $\delta$) were measured at 1 KHz, 1 Vrms and 20° C.. The temperature coefficient of capacitance (T.C.) is change in capacitance based on the capacitance at 20° C. and is given by the following equation:

$$\text{Temperature coefficient of Capacitance } (TC) = \frac{C_2 - C_1}{C_1} \times \frac{1}{85 - 20} \times 10^6 \text{ (ppm/°C.)}$$

where
$C_1$ = capacitance at 20° C.
$C_2$ = capacitance at 85° C.

The specific resistance ($\rho$) was determined by measurement of a current flowing through the specimen when applied with a DC voltage of 500 volts at 20° C. and 85° C. Results are shown in Table 2 as well as the sintering temperature (Ts). In the tables, asterisked specimens are those beyond the scope of the present invention, while others are those falling within the scope of the present invention.

TABLE 1

| Sample No. | Main component (molar ratio) | | | | | Secondary component (part by weight) | |
|---|---|---|---|---|---|---|---|
| | m | SrO 1−x | CaO x | TiO₂ 1−y | ZrO₂ y | MnO₂ j | SiO₂ k |
| 1* | 0.99 | 0.72 | 0.28 | 0.90 | 0.10 | 0.50 | 2.00 |
| 2 | " | 0.70 | 0.30 | " | " | " | " |
| 3 | " | 0.60 | 0.40 | " | " | " | " |
| 4 | " | 0.50 | 0.50 | " | " | " | " |
| 5* | " | 0.54 | 0.46 | " | " | " | " |
| 6* | " | 0.60 | 0.40 | 1.00 | 0 | " | " |
| 7 | " | " | " | 0.97 | 0.03 | " | " |
| 8 | " | " | " | 0.80 | 0.20 | " | " |
| 9* | " | " | " | 0.75 | 0.25 | " | " |
| 10* | 0.93 | " | " | 0.90 | 0.10 | " | " |
| 11 | 0.95 | " | " | " | " | " | " |
| 12 | 1.00 | " | " | " | " | " | " |
| 13 | 1.08 | " | " | " | " | " | " |
| 14* | 1.10 | " | " | " | " | " | " |
| 15* | 0.99 | " | " | " | " | 0 | " |
| 16 | " | " | " | " | " | 0.01 | " |
| 17 | " | " | " | " | " | 1.00 | " |
| 18 | " | " | " | " | " | 2.00 | " |
| 19* | " | " | " | " | " | 2.50 | " |
| 20* | " | " | " | " | " | 0.50 | 0 |
| 21 | " | " | " | " | " | " | 0.10 |
| 22 | " | " | " | " | " | " | 0.50 |
| 23 | " | " | " | " | " | " | 3.00 |
| 24 | " | " | " | " | " | " | 4.00 |
| 25* | " | " | " | " | " | " | 4.50 |

TABLE 2

| No. | Ts (°C.) | $\epsilon$ | tan δ (%) | T.C. (ppm/°C.) | $\rho$ (Ω cm) 20° C. |
|---|---|---|---|---|---|
| 1* | 1430 | 264 | 0.16 | −1820 | 3 × 10¹² |
| 2 | 1330 | 228 | 0.07 | −890 | 4 × 10¹² |
| 3 | 1300 | 217 | 0.08 | −950 | 7 × 10¹² |
| 4 | 1330 | 216 | 0.09 | −940 | 6 × 10¹² |
| 5* | 1400 | 203 | 0.13 | −1890 | 2 × 10¹² |
| 6* | 1300 | 241 | 0.85 | −950 | 7 × 10¹⁰ |
| 7 | 1270 | 214 | 0.05 | −880 | 7 × 10¹² |
| 8 | " | 210 | 0.03 | −910 | 2 × 10¹³ |
| 9* | 1390 | 203 | 0.02 | −1740 | 3 × 10¹² |
| 10* | 1270 | 208 | 0.90 | −890 | 4 × 10¹⁰ |
| 11 | " | 217 | 0.04 | −940 | 3 × 10¹² |
| 12 | 1330 | 220 | 0 02 | −950 | 4 × 10¹² |
| 13 | 1360 | 218 | 0.03 | −910 | 8 × 10¹² |
| 14* | 1400 | 201 | 0.05 | −1750 | 7 × 10¹² |
| 15* | 1390 | 224 | 0.69 | −920 | 1 × 10¹⁰ |
| 16 | 1300 | 218 | 0.11 | " | 2 × 10¹² |
| 17 | " | 211 | 0.09 | −890 | 7 × 10¹² |
| 18 | 1330 | 208 | 0.18 | " | 3 × 10¹² |
| 19* | 1360 | 202 | 0.71 | −2000 | 2 × 10¹⁰ |
| 20* | 1400 | 248 | 0.05 | −1910 | 3 × 10¹² |
| 21 | 1360 | 221 | 0.14 | −860 | 4 × 10¹² |
| 22 | 1330 | 218 | 0.18 | −920 | 3 × 10¹² |
| 23 | 1270 | 209 | 0.19 | −950 | 2 × 10¹³ |
| 24 | 1240 | 200 | 0.20 | −980 | 4 × 10¹² |
| 25* | " | 176 | 0.73 | −940 | 3 × 10¹⁰ |

As can be seen from the results shown in Table 2, the nonreducible dielectric ceramic composition of the present invention is sintered in a reducing atmosphere at 1360° C. or below, has a small temperature coefficient of capacitance of not more than 1000 ppm/°C. in the absolute value, dielectric constant of not less than 200, dielectric loss of not more than 0.2%, and specific resistance at 20° C. of not less than 10¹² Ωcm.

EXAMPLE 2

Using $SrCO_3$, $CaCO_3$, $ZrO_2$, $TiO_2$, $MnO_2$, $SiO_2$ and MgO for industrial use as starting raw materials, there were prepared mixtures by weighing them in such proportions that their final products respectively have a composition expressed by the formula:

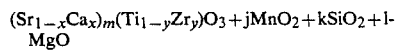
$(Sr_{1-x}Ca_x)_m(Ti_{1-y}Zr_y)O_3 + jMnO_2 + kSiO_2 + l\text{MgO}$ with values of x, y, m, j, k and l shown in Table 3. Each resultant mixture was mixed by the wet process in a ball mill, dried by evaporation, calcined in natural atmosphere at 1150° C. for 2 hours, crushed and then ground to prepare calcined powder. The calcined powder was added with 5 parts by weight of a vinyl acetate binder and granulated in a ball mill by the wet process, dried by evaporation and passed through a sieve to prepare granulated powder. The resultant powder was compacted to green ceramic discs with a 10 mm diameter and a 1.2 mm thickness under a pressure of 2.5 ton/cm².

The green discs were placed on an alumina sugger having its bottom covered with zirconia powder, heated to 500° C. and maintained at that temperature for 2 hours in air to burn the binder, and then fired at 1240 ° to 1360° C. for 2 hours in a reducing atmosphere consisting of hydrogen and nitrogen and having a volume ratio of $H_2$ to $N_2$ is 3/100.

Sintered ceramic discs were provided with In-Ga alloy electrodes on opposite sides to prepare test specimens. The measurements of dielectric constant ($\epsilon$), dielectric loss (tan δ), temperature coefficient of capacitance (T.C.) and specific resistance ($\rho$) were carried out in the same manner as in Example 1 under the same conditions. Results are shown in Table 4 as well as the sintering temperature (Ts). In the tables, asterisked specimens are those beyond the scope of the present invention, while others are those falling within the scope of the present invention.

TABLE 3

| Sample No. | Main component (molar ratio) | | | | | Secondary component (part by weight) | | |
|---|---|---|---|---|---|---|---|---|
| | m | SrO 1−x | CaO x | TiO$_2$ 1−y | ZrO$_2$ y | MnO$_2$ j | SiO$_2$ k | MgO l |
| 26* | 0.99 | 0.72 | 0.28 | 0.90 | 0.10 | 0.50 | 2.00 | 0.30 |
| 27 | " | 0.70 | 0.30 | " | " | " | " | " |
| 28 | " | 0.60 | 0.40 | " | " | " | " | " |
| 29 | " | 0.50 | 0.50 | " | " | " | " | " |
| 30* | " | 0.54 | 0.46 | " | " | " | " | " |
| 31* | " | 0.60 | 0.40 | 1.00 | 0 | " | " | " |
| 32 | " | " | " | 0.97 | 0.03 | " | " | " |
| 33 | " | " | " | 0.80 | 0.20 | " | " | " |
| 34* | " | " | " | 0.75 | 0.25 | " | " | " |
| 35* | 0.93 | " | " | 0.90 | 0.10 | " | " | " |
| 36 | 0.95 | " | " | " | " | " | " | " |
| 37 | 1.00 | " | " | " | " | " | " | " |
| 38 | 1.08 | " | " | " | " | " | " | " |
| 39* | 1.10 | " | " | " | " | " | " | " |
| 40* | 0.99 | " | " | " | " | 0 | " | " |
| 41 | " | " | " | " | " | 0.01 | " | " |
| 42 | " | " | " | " | " | 1.00 | " | " |
| 43 | " | " | " | " | " | 2.00 | " | " |
| 44* | " | " | " | " | " | 2.50 | " | " |
| 45* | " | " | " | " | " | 0.50 | 0 | " |
| 46 | " | " | " | " | " | " | 0.10 | " |
| 47 | " | " | " | " | " | " | 0.50 | " |
| 48 | " | " | " | " | " | " | 3.00 | " |
| 49 | " | " | " | " | " | " | 4.00 | " |
| 50* | " | " | " | " | " | " | 4.50 | " |
| 51* | " | " | " | " | " | " | 2.00 | 0 |
| 52 | " | " | " | " | " | " | " | 0.01 |
| 53 | " | " | " | " | " | " | " | 0.50 |
| 54 | " | " | " | " | " | " | " | 1.00 |
| 55* | " | " | " | " | " | " | " | 1.20 |

TABLE 4

| No. | Ts (°C.) | ε | tan δ 20° C. (%) | T.C. (ppm/°C.) | Specific resistance (Ω-cm) 20° C. | 85° C. |
|---|---|---|---|---|---|---|
| 26* | 1420 | 263 | 0.17 | −1820 | 7 × 10$^{12}$ | 2 × 10$^{12}$ |
| 26 | 1330 | 231 | 0.13 | −890 | 8 × 10$^{12}$ | 3 × 10$^{12}$ |
| 28 | 1300 | 224 | 0.12 | " | 1 × 10$^{13}$ | 6 × 10$^{12}$ |
| 29 | " | 221 | 0.10 | −910 | 2 × 10$^{13}$ | 5 × 10$^{12}$ |
| 30* | 1400 | 207 | 0.11 | −890 | 9 × 10$^{12}$ | 4 × 10$^{12}$ |
| 31* | 1270 | 243 | 0.91 | −1850 | 4 × 10$^{10}$ | 7 × 10$^{8}$ |
| 32 | " | 213 | 0.08 | −850 | 8 × 10$^{12}$ | 3 × 10$^{12}$ |
| 33 | 1300 | 212 | 0.04 | " | 4 × 10$^{13}$ | 1 × 10$^{12}$ |
| 34* | 1390 | 209 | 0.08 | −1830 | 7 × 10$^{12}$ | 2 × 10$^{12}$ |
| 35* | 1300 | 213 | 0.95 | −970 | 7 × 10$^{10}$ | 8 × 10$^{8}$ |
| 36 | " | 221 | 0.03 | −940 | 6 × 10$^{12}$ | 2 × 10$^{12}$ |
| 37 | 1330 | 226 | " | −890 | 1 × 10$^{13}$ | 6 × 10$^{12}$ |
| 38 | 1360 | 223 | 0.12 | −920 | 2 × 10$^{13}$ | 8 × 10$^{12}$ |
| 39* | 1390 | 204 | 0.08 | −2030 | 8 × 10$^{12}$ | 2 × 10$^{12}$ |
| 40* | " | 228 | 0.73 | −890 | 4 × 10$^{10}$ | 9 × 10$^{8}$ |
| 41 | 1300 | 225 | 0.04 | " | 9 × 10$^{12}$ | 4 × 10$^{12}$ |
| 42 | " | 218 | 0.07 | −920 | 8 × 10$^{12}$ | 2 × 10$^{12}$ |
| 43 | 1330 | 214 | 0.03 | −950 | 3 × 10$^{13}$ | 7 × 10$^{12}$ |
| 44* | 1360 | 208 | 0.85 | −1740 | 7 × 10$^{10}$ | 1 × 10$^{9}$ |
| 45* | 1390 | 251 | 0.04 | −1970 | 1 × 10$^{13}$ | 8 × 10$^{12}$ |
| 46 | 1360 | 223 | 0.06 | −920 | 8 × 10$^{12}$ | 2 × 10$^{12}$ |
| 47 | 1330 | 218 | 0.06 | −910 | 7 × 10$^{12}$ | 3 × 10$^{12}$ |
| 48 | 1270 | 210 | 0.03 | " | 2 × 10$^{13}$ | 1 × 10$^{12}$ |
| 49 | 1240 | 201 | 0.10 | −940 | 8 × 10$^{12}$ | 4 × 10$^{12}$ |
| 50* | " | 174 | 0.93 | " | 9 × 10$^{10}$ | 3 × 10$^{9}$ |
| 51* | 1300 | 217 | 0.08 | −950 | 7 × 10$^{12}$ | 6 × 10$^{10}$ |
| 52 | 1270 | 219 | 0.03 | −890 | 1 × 10$^{13}$ | 6 × 10$^{12}$ |
| 53 | " | 224 | 0.08 | −950 | 4 × 10$^{13}$ | 8 × 10$^{12}$ |
| 54 | " | 223 | 0.10 | −980 | 3 × 10$^{13}$ | 7 × 10$^{12}$ |
| 55* | " | 226 | 0.17 | −2000 | 2 × 10$^{13}$ | 5 × 10$^{12}$ |

As can be seen from the results shown in Table 4, the nonreducible dielectric ceramic composition of the present invention is sintered in a reducing atmosphere at 1360° C. and below, and has a small temperature coefficient of capacitance of not more than 1000 ppm/°C. in the absolute value, a high dielectric constant of not less than 200, a low dielectric loss of not more than 0.2%, and a high specific resistance at 20° C. of not less than 10$^{12}$ Ω-cm.

EXAMPLE 3

Using SrCO$_3$, CaCO$_3$, ZrO$_2$, TiO$_2$, MnO$_2$, SiO$_2$ and ZnO for industrial use as starting raw materials, there were prepared mixtures by weighing them in such proportions that their final products respectively have a composition expressed by the formula:

$$(Sr_{1-x}Ca_x)_m(Ti_{1-y}Zr_y)O_3 + jMnO_2 + kSiO_2 + ZnO$$

with values of x, y, m, j, k and l shown in Table 5. Each resultant mixture was mixed by the wet process in a ball mill, dried by evaporation, calcined in natural atmosphere at 1150° C. for 2 hours, crushed and then ground to prepare calcined powder. The calcined powder was added with 5 parts by weight of a vinyl acetate binder and granulated in a ball mill by the wet process, dried by evaporation and passed through a sieve to prepare granulated powder. The resultant powder was compacted to green ceramic discs with a 10 mm diameter and a 1.2 mm thickness under a pressure of 2.5 ton/cm$^2$.

The green discs were placed on an alumina sugger having its bottom covered with zirconia powder, heated to 500° C. and maintained at that temperature for 2 hours in air to burn the binder, and then fired at 1240° to 1360° C. for 2 hours in a reducing atmosphere consisting of hydrogen and nitrogen and having a volume ratio of H$_2$ to N$_2$ is 3/100.

Sintered ceramic discs were provided with In-Ga alloy electrodes on opposite sides to prepare test specimens. The measurements of dielectric characteristics were carried out in the same manner as in Example 1 under the same conditions. Results are shown in Table 6 as well as the sintering temperature (Ts). In the tables, asterisked specimens are those beyond the scope of the present invention, while others are those falling within the scope of the present invention.

TABLE 5

| Sample No. | Main component | | | | | Secondary component (part by weight) | | |
|---|---|---|---|---|---|---|---|---|
| | m | SrO 1−x | CaO x | TiO$_2$ 1−y | ZrO$_2$ y | MnO$_2$ j | SiO$_2$ k | ZnO l |
| 56* | 0.99 | 0.72 | 0.28 | 0.90 | 0.10 | 0.50 | 2.00 | 0.30 |
| 57 | " | 0.70 | 0.30 | " | " | " | " | " |
| 58 | " | 0.60 | 0.40 | " | " | " | " | " |
| 59 | " | 0.50 | 0.50 | " | " | " | " | " |
| 60* | " | 0.54 | 0.46 | " | " | " | " | " |
| 61* | " | 0.60 | 0.40 | 1.00 | 0 | " | " | " |
| 62 | " | " | " | 0.97 | 0.03 | " | " | " |
| 63 | " | " | " | 0.80 | 0.20 | " | " | " |
| 64* | " | " | " | 0.75 | 0.25 | " | " | " |
| 65* | 0.93 | " | " | 0.90 | 0.10 | " | " | " |
| 66 | 0.95 | " | " | " | " | " | " | " |
| 67 | 1.00 | " | " | " | " | " | " | " |
| 68 | 1.08 | " | " | " | " | " | " | " |
| 69* | 1.10 | " | " | " | " | " | " | " |
| 70* | 0.99 | " | " | " | " | 0 | " | " |
| 71 | " | " | " | " | " | 0.01 | " | " |
| 72 | " | " | " | " | " | 1.00 | " | " |
| 73 | " | " | " | " | " | 2.00 | " | " |
| 74* | " | " | " | " | " | 2.50 | " | " |

TABLE 5-continued

| Sample No. | Main component | | | | | Secondary component (part by weight) | | |
|---|---|---|---|---|---|---|---|---|
| | m | SrO 1−x | CaO x | TiO$_2$ 1−y | ZrO$_2$ y | MnO$_2$ j | SiO$_2$ k | ZnO l |
| 75* | " | " | " | " | " | 0.50 | 0 | " |
| 76 | " | " | " | " | " | " | 0.10 | " |
| 77 | " | " | " | " | " | " | 0.50 | " |
| 78 | " | " | " | " | " | " | 3.00 | " |
| 79 | " | " | " | " | " | " | 4.00 | " |
| 80* | " | " | " | " | " | " | 4.50 | " |
| 81* | " | " | " | " | " | " | 2.00 | 0 |
| 82 | " | " | " | " | " | " | " | 0.01 |
| 83 | " | " | " | " | " | " | " | 0.50 |
| 84 | " | " | " | " | " | " | " | 1.00 |
| 85* | " | " | " | " | " | " | " | 1.20 |

TABLE 6

| Sample | Ts (°C.) | ε | tan δ (%) | T.C. (ppm/°C.) | ρ (Ω cm) 20° C. | ρ (Ω cm) 85° C. |
|---|---|---|---|---|---|---|
| 56* | 1400 | 265 | 0.17 | −1860 | 8 × 10$^{12}$ | 2 × 10$^{12}$ |
| 57 | 1330 | 233 | 0.10 | −910 | 9 × 10$^{12}$ | 1 × 10$^{12}$ |
| 58 | 1300 | 223 | 0.12 | −920 | 2 × 10$^{13}$ | 5 × 10$^{12}$ |
| 59 | " | 221 | 0.10 | −890 | 1 × 10$^{13}$ | 3 × 10$^{12}$ |
| 60* | 1390 | 208 | 0.13 | −1890 | 7 × 10$^{12}$ | 1 × 10$^{12}$ |
| 61* | 1270 | 244 | 0.93 | −920 | 2 × 10$^{10}$ | 7 × 10$^{8}$ |
| 62 | " | 218 | 0.07 | −920 | 3 × 10$^{13}$ | 5 × 10$^{12}$ |
| 63 | " | 215 | 0.04 | −890 | 7 × 10$^{13}$ | 3 × 10$^{12}$ |
| 64* | 1390 | 208 | 0.06 | −1740 | 8 × 10$^{12}$ | 4 × 10$^{12}$ |
| 65* | 1270 | 213 | 0.98 | −940 | 8 × 10$^{10}$ | 9 × 10$^{8}$ |
| 66 | 1300 | 221 | 0.05 | −950 | 7 × 10$^{12}$ | 3 × 10$^{12}$ |
| 67 | 1330 | 225 | 0.06 | −980 | 9 × 10$^{12}$ | 1 × 10$^{12}$ |
| 68 | 1360 | 223 | 0.08 | −940 | 4 × 10$^{13}$ | 2 × 10$^{12}$ |
| 69* | 1400 | 206 | 0.09 | −1780 | 1 × 10$^{13}$ | 3 × 10$^{12}$ |
| 70* | " | 229 | 0.77 | −970 | 5 × 10$^{10}$ | 2 × 10$^{9}$ |
| 71 | 1300 | 223 | 0.14 | −950 | 7 × 10$^{12}$ | 1 × 10$^{12}$ |
| 72 | " | 216 | 0.11 | −890 | 3 × 10$^{13}$ | 4 × 10$^{12}$ |
| 73 | 1330 | 213 | 0.19 | −820 | 8 × 10$^{12}$ | 2 × 10$^{12}$ |
| 74* | 1360 | 207 | 0.80 | −970 | 7 × 10$^{10}$ | 1 × 10$^{9}$ |
| 75* | 1390 | 252 | 0.09 | −1940 | 6 × 10$^{12}$ | 3 × 10$^{12}$ |
| 76 | 1360 | 224 | 0.16 | −830 | 9 × 10$^{12}$ | 1 × 10$^{12}$ |
| 77 | 1330 | 219 | 0.19 | −820 | 8 × 10$^{12}$ | 4 × 10$^{12}$ |
| 78 | 1270 | 211 | 0.20 | " | 7 × 10$^{12}$ | 3 × 10$^{12}$ |
| 79 | 1240 | 202 | 0.20 | −910 | 9 × 10$^{12}$ | 2 × 10$^{12}$ |
| 80* | " | 178 | 0.88 | −930 | 8 × 10$^{10}$ | 1 × 10$^{9}$ |
| 81* | 1300 | 217 | 0.08 | −950 | 7 × 10$^{12}$ | 6 × 10$^{10}$ |
| 82 | 1270 | 218 | 0.09 | −980 | 1 × 10$^{13}$ | 6 × 10$^{12}$ |
| 83 | " | 220 | 0.03 | −950 | 3 × 10$^{13}$ | 8 × 10$^{12}$ |
| 84 | " | 221 | 0.06 | −890 | 4 × 10$^{13}$ | 9 × 10$^{12}$ |
| 85* | " | 224 | 0.18 | −1830 | 3 × 10$^{13}$ | 3 × 10$^{12}$ |

As can be seen from the results shown in Table 6, the nonreducible dielectric ceramic composition of the present invention is sintered at a temperature of not more than 1360° C. in a reducing atmosphere, and it has a small temperature coefficient of capacitance of not more than 1000 ppm/°C. in the absolute value, a high dielectric constant of not less than 200, a low dielectric loss of not more than 0.2%, and a high specific resistance at 20° C. of not less than 10$^{12}$ Ωcm.

In the above examples, the sintering is carried out in a reducing atmosphere consisting of hydrogen and nitrogen, but it may be carried out in other neutral or reducing atmosphere consisting of Ar, CO, CO$_2$, H$_2$, N$_2$ or a mixture of these gases.

What I claim is:

1. A nonreducible dielectric ceramic composition consisting essentially of a main component expressed by the formula:

$$(Sr_{1-x}Ca_x)_m(Ti_{1-y}Zr_y)O_3$$

wherein the subscripts x and y are molar fractions of the respective elements, and m is molar ratio of $(Sr_{1-x}Ca_x)$ to $(Ti_{1-y}Zr_y)$, and wherein x, y and m take values within the following respective ranges: $0.30 \leq x \leq 0.50$, $0.03 \leq y \leq 0.20$, $0.95 < m \leq 1.08$, and secondary components composed of manganese oxides and SiO$_2$, the content of each secondary component per 100 parts by weight of the main component being 0.01 to 2.00 parts by weight for manganese oxides in terms of MnO$_2$, and 0.10 to 4.00 parts by weight for SiO$_2$.

2. A non-reducible dielectric ceramic composition according to claim 1 in which m is 0.99, x is 0.4, y is 0.1, the amount of manganese oxide in terms of MnO$_2$ is 0.5 and the amount of SiO$_2$ is at least 2 parts.

3. A nonreducible dielectric ceramic composition consisting essentially of a main component expressed by the formula:

$$(Sr_{1-x}Ca_x)_m(Ti_{1-y}Zr_y)O_3$$

wherein the subscripts x and y are molar fractions of the respective elements, and m is a molar ratio of $(Sr_{1-x}Ca_x)$ to $(Ti_{1-y}Zr_y)$, and wherein x, y and m take values within the following respective ranges: $0.30 \leq x < 0.50$, $0.03 \leq y < 0.20$, $0.95 \leq m \leq 1.08$, and secondary components composed of manganese oxides, SiO$_2$ and MgO, the content of each secondary component per 100 parts by weight of the main component being 0.01 to 2.00 parts by weight for manganese oxides in terms of MnO$_2$, 0.10 to 4.00 parts by weight for SiO$_2$, and 0.01 to 1.00 parts by weight for MgO.

4. A non-reducible dielectric ceramic composition according to claim 3 in which the amount of MgO is at least 0.3 part.

5. A non-reducible dielectric ceramic composition according to claim 4 in which m is 0.99, x is 0.4, y is 0.1, the amount of manganese oxide in terms of MnO$_2$ is 0.5 and the amount of SiO$_2$ is at least 2 parts.

6. A nonreducible dielectric ceramic composition consisting essentially of a main component expressed by the formula:

$$(Sr_{1-x}Ca_x)_m(Ti_{1-y}Zr_y)O_3$$

wherein the subscripts x and y are molar fractions of the respective elements, and m is a molar ratio of $(Sr_{1-x}Ca_x)$ to $(Ti_{1-y}Zr_y)$, and wherein x, y and m take values within the following respective ranges: $0.30 \leq x \leq 0.50$, $0.03 \leq y \leq 0.20$, $0.95 \leq m \leq 1.08$, and secondary components composed of manganese oxides, SiO$_2$ and ZnO, the content of each secondary component per 100 parts by weight of the main component being 0.01 to 2.00 parts by weight for manganese oxides in terms of MnO$_2$, 0.10 to 4.00 parts by weight for SiO$_2$, and 0.01 to 1.00 parts by weight for ZnO.

7. A non-reducible dielectric ceramic composition according to claim 3 in which the amount ZnO is at least 0.3 part.

8. A non-reducible dielectric ceramic composition according to claim 7 in which m is 0.99, x is 0.4, y is 0.1, the amount of manganese oxide in terms of MnO$_2$ is 0.5 and the amount of SiO$_2$ is at least 2 parts.

* * * * *